United States Patent [19]

Warner

[11] 4,293,805
[45] Oct. 6, 1981

[54] SENSING AND CONTROL APPARATUS FOR A COMMUTATOR

[76] Inventor: Allan S. Warner, 50 Haliday St., Clark, N.J. 07066

[21] Appl. No.: 52,122

[22] Filed: Jun. 25, 1979

[51] Int. Cl.³ ............................ B23Q 5/10; B23Q 5/28
[52] U.S. Cl. ..................................... 318/39; 318/640; 29/597
[58] Field of Search .................. 318/640, 39; 250/227; 350/96.10, 96.20; 29/597

[56] References Cited

U.S. PATENT DOCUMENTS

| | | | |
|---|---|---|---|
| 3,714,447 | 1/1973 | Jallais | 250/227 |
| 3,911,563 | 10/1975 | Anderson | 29/597 |
| 3,970,394 | 7/1976 | Stanton | 250/227 |
| 3,986,778 | 10/1976 | Mathisen et al. | 250/227 |
| 4,033,698 | 7/1977 | Demsky et al. | 250/227 |
| 4,162,399 | 7/1979 | Hudson | 250/227 |

Primary Examiner—J. V. Truhe
Assistant Examiner—Eugene S. Indyk
Attorney, Agent, or Firm—Lerner, David, Littenberg & Samuel

[57] ABSTRACT

Apparatus is provided for sensing a location on a commutator and, in response thereto, actuating a tool for performing an operation on the commutator. The apparatus includes a device for mounting the commutator for rotation so that it may be indexed to successive commutator bars which are to be worked on. There is also a light source and a device for directing light from the source to the surface of the commutator, and a device for directing the reflection of light from the commutator surface to a sensing device. When the light beam impinges on a non-reflective area of the commutator so that the sensing device is not actuated, the sensing device signals a control circuit for stopping the rotation of said commutator and for actuating a tool for performing an operation on the commutator. In order to prevent the interference of ambient light with the operation of the sensing apparatus, a protective housing is provided for at least partially enclosing the light-directing devices.

13 Claims, 5 Drawing Figures

SENSING AND CONTROL APPARATUS FOR A COMMUTATOR

FIELD OF THE INVENTION

The present invention relates generally to commutators and specifically to an improved apparatus for sensing locations on commutator bars and, in response thereto, actuating a tool for performing an operation on the commutator.

BACKGROUND OF THE INVENTION

In the manufacture of armatures and commutators, a number of operations must be performed on the commutator. For example, each commutator bar must have a slot formed therein for receiving the armature wires. After the slots have been formed in the commutator bars, the armature wires are inserted therein, and then a fusing or brazing operation is performed to weld the armature wires in place. Also, an undercutting operation is typically performed on the commutator to cut out the insulating mica between the commutator bars so that it does not wear out the contacting brushes. In order to perform each of these operations, it is necessary to mount the armature and commutator for rotation so that successive commutator bars can be indexed into operating position. In addition, in order to automate such operations, it is necessary for the machine performing the operations to know whether a commutator bar is in the proper position to be operated on. For example, in order to form a slot in each commutator bar, it is necessary for the commutator to be rotated to bring the central area of each commutator bar into proper position, and then the rotation is stopped and a cutting tool is actuated to form the slot in the commutator bar. The commutator is then rotated to bring the next commutator bar into position so that a slot can be formed therein.

In the prior art, a number of ways have been developed to bring each successive commutator bar into operating position. For example, in one prior art arrangement, a ratchet and indexing mechanism are employed, with the ratchet having the same number of teeth as the commutator has bars. In this manner, each operation of the ratchet brings the next commutator bar into position. Such an arrangement has been generally satisfactory, where the commutator has a relatively small number of commutator bars, such as twenty-five. However, in those cases where the commutator has, for example, one hundred or more commutator bars, such an arrangement has proven to be unsatisfactory. In such cases, with such a large number of commutator bars, the bars are difficult to manufacture with great accuracy, so that some commutator bars may be of slightly different widths, and the spacing between commutator bars may also vary slightly. As a result, as the commutator is rotated to bring each of the one hundred bars into operating position, the inaccuracies accumulate such that, in many instances, the operation to be performed on the commutator bar is not performed at the right location. For example, a slot may be formed in the commutator bar, such that it overlaps the insulating mica between adjacent commutator bars. As a result, the entire commutator is defective.

In another prior art arrangement, a light source is employed to direct a light beam to the surface of the commutator, and a photocell is employed to detect the reflection of light from reflective areas of the commutator surface, or the non-reflection of light from non-reflective areas of the commutator surface. Such light sensing devices are then employed to actuate a tool for performing an operation on the commutator, such as the slotting tool for forming a slot in the commutator bar, or the stuffing tool for inserting armature wires into the commutator slot, or a fusing or brazing tool. However, the drawback with such an arrangement is that there has been a problem with ambient and/or stray light being detected by the light sensor which causes a tool to be actuated and to perform an operation on the commutator at an incorrect location which causes a defect in the commutator.

Another prior art arrangement is disclosed in U.S. Pat. No. 3,911,563 which recognizes that there are inaccuracies in the manufacture of commutators, such that the spacing between commutator bars is not uniform, and also that there are inaccuracies with respect to the spacing between slots that are cut into the commutator bars. This prior art patent accepts such inaccuracies and attempts to correct for them by controlling the drive means which rotates the commutator. To accomplish this, sensing apparatus is provided to identify the actual characteristics of the commutator, which are recorded in the memory of a computer to be used in effecting accurate indexing of the commutator. Accordingly, in such an arrangement, the commutator must be rotated through two complete revolutions: one revolution is for the computer to be supplied the actual characteristics of the commutator, and the second revolution is for performing a work operation on the commutator. Such a system is time consuming and requires complex and costly apparatus. In addition, even such a complex and costly system is also subject to the drawback discussed above of the light-sensing device being subject to ambient and/or stray light which causes inaccuracies in the system.

Accordingly, it is an object of the present invention to provide an improved apparatus which overcomes the aforesaid problems. Specifically, it is within the contemplation of the present invention to provide an improved apparatus which is simple and inexpensive, yet avoids the problems that the prior art arrangements have experienced with respect to ambient and/or stray light.

It is a further object of the present invention to provide an improved apparatus for accurately sensing predetermined locations on commutators which are inaccurately manufactured and, in response thereto, actuating tools for performing manufacturing operations on the commutator, such as slotting, stuffing of armature wires, fusing, or undercutting.

SUMMARY OF THE INVENTION

Briefly, in accordance with the principles of the present invention, an improved apparatus is provided for sensing a predetermined location on a commutator and, in response thereto, actuating a tool for performing an operation on the commutator. The armature and commutator assembly is mounted for rotation so that each commutator bar can be indexed successively into an operating position for performing an operation thereon, such as forming a slot in the commutator bar, or inserting armature wires into the commutator slot, or a fusing operation, or an undercutting operation. The apparatus of the present invention includes a light source, such as a light-emitting diode, which is positioned a predetermined distance from the commutator surface. A device, such as a first fiber-optic bundle, is provided for directing light from the light source to the surface of the commutator. In the preferred embodiment, the end of the fiber-optic bundle is closely spaced to the commutator surface. For example, there is a space of 0.010" between the end of the fiber-optic bundle and the commutator surface. There is also provided a device, such as a second fiber-optic bundle, for directing reflected light from the surface of the commutator to a sensing device, such as a photocell. When the predetermined location is sensed, the photocell then provides an output signal to a control circuit, including a servomotor for a tool, for stopping rotation of the commutator and for performing an operation on the commutator. For example, the output signal of the photocell can be supplied to the servomotor for a slotting tool which is operated to form a slot in the commutator bar. Alternatively, the output signal of the photocell can be supplied to a stuffing tool for inserting armature wires into commutator slots.

In accordance with the present invention, a protective device is provided for at least partially enclosing the fiber-optic bundles and is positioned in engagement with the commutator surface to prevent the interference of ambient and/or stray light with the operation of the fiber-optic bundles and the photocell. In one embodiment, the lower ends of the fiber-optic bundles enter the protective housing which shields the fiber-optic bundles from the effect of ambient and/or stray light which could improperly supply light to the photocell.

In an alternative embodiment, the protective device is a housing having V-shaped or converging pathways, with one enclosed pathway directing light to the surface of the commutator and with the other enclosed pathway directing reflected light from the surface of the commutator to the photocell. In this manner, the enclosed pathways between the light source and the surface of the commutator, and between the photocell and the surface of the commutator, prevent the interference of ambient and/or stray light.

Advantageously, as a result of the present invention, a simple and inexpensive device has been provided for accurately sensing a predetermined location on a commutator which is not affected by ambient and/or stray light and which is not affected by inaccuracies in the manufacture of the commutator, such as differences in the widths of commutator bars and differences in the spacing between commutator bars, or differences in the location of commutator slots which are formed in the commutator bars.

BRIEF DESCRIPTION OF THE DRAWINGS

Further objects, features, and advantages of the present invention will become apparent upon the consideration of the following detailed description of presently preferred embodiments when taken in conjunction with the accompanying drawings, wherein.

DETAILED DISCUSSION OF PREFERRED EMBODIMENTS OF THE INVENTION

Figure 1:
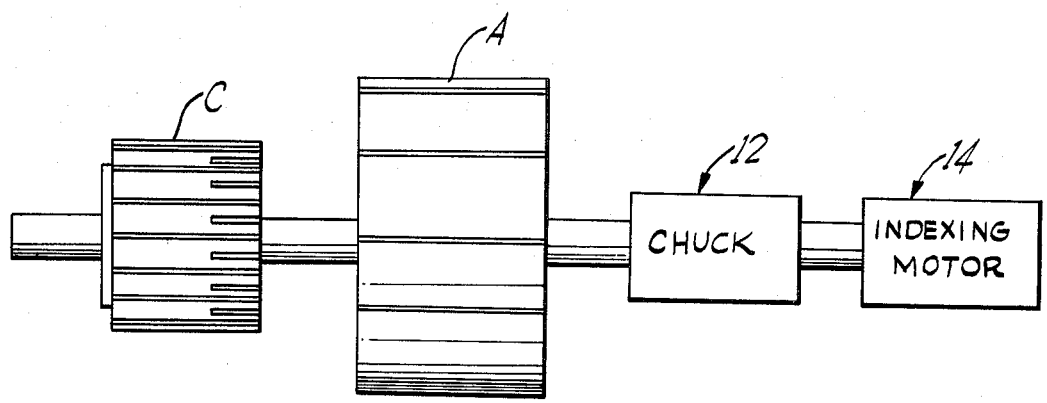
FIG. 1 is a diagrammatic illustration of an armature and commutator assembly mounted in a conventional chuck which is driven by an indexing motor to rotate the commutator to successive positions.

Referring now to FIG. 1, there is shown an assembly of an armature A and commutator C which is supported in a chuck 12 which is driven by an indexing motor 14 to index and rotate the armature-commutator assembly to successive positions. Apparatus for supporting and indexing armature assemblies is well known in the art and need not be described in further detail. An example of a suitable indexing arrangement is disclosed in U.S. Pat. No. 3,156,037.

Figure 2:
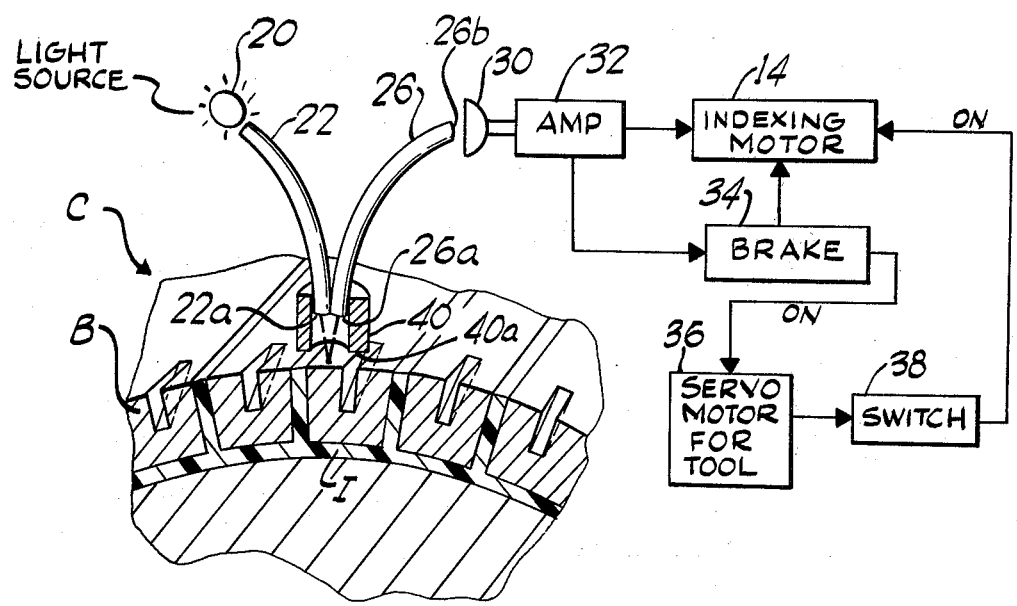
FIG. 2 is an elevational and diagrammatic view of apparatus embodying the principles of the present invention.

Referring now to FIG. 2, there is shown apparatus for sensing a predetermined location on a commutator in accordance with the present invention. The commutator C includes commutator bars B with insulating material I, such as mica, located between and under the commutator bars B, as is well known. The commutator bars are formed of a metallic material, such as copper, so that the commutator bars form reflective surface areas. However, the insulating material I between the commutator bars B is dark in color and forms non-reflective areas. In addition, if slots have been formed in the bars B, they also form non-reflective areas, since a light beam which enters a slot will not be reflected out of the slot, since it will impinge on the sidewalls of the slot.

In order to detect a predetermined location on the surface of the commutator, such as the insulated spacings between the bars B, a light source 20 is provided and is mounted at a predetermined distance from the commutator surface. The light source may be of any type, such as a light-emitting diode or a lamp. In addition, a fiber-optic bundle 22 is provided for directing light from the light source 20 to the surface of the commutator. Such fiber-optic bundles are well known and typically include finished optical faces at each end thereof in order to enhance the transmission of light. The optical face 22a of bundle 22 is spaced a very small distance from the surface of the commutator, such spacing being sufficient to avoid frictional or rubbing engagement between optical face 22a and the surface of the commutator as the commutator is rotated or indexed to each successive position.

Another fiber-optic bundle 26 is provided which includes finished optical faces at each end thereof and is generally similar to fiber-optic bundle 22. Fiber-optic bundle 26 includes an optical face 26a which is also closely spaced to the surface of the commutator to prevent rubbing engagement. In the preferred embodiment, optical faces 22a, 26a are spaced approximately 0.010" from the commutator surface. Although the specific mounting means are not shown, fiber-optic bundles 22 and 26 are mounted adjacent to the commutator surface by any suitable supporting means. In addition, it should also be understood that the supporting means for the fiber-optic bundles are adjustable so that the positions of optical faces 22a, 26a may be vertically adjusted to accommodate commutators of various diameters.

Optical face 26b of fiber-optic bundle 26 is positioned adjacent to a photocell 30 for sensing the reflection and non-reflection of light from the commutator surface.

Such photocells or photodetectors are well known in the art. In the present invention, it is preferred that the photocell have a threshold level which can be adjusted so that only reflected light of a minimum magnitude will cause the photocell to emit a signal. The signal is applied to an amplifier 32 which amplifies the signal and supplies it to drive indexing motor 14 to rotate commutator C as long as light is being reflected from the surface of the commutator. However, when the insulation area I is reached, the light will not be reflected to photocell 30. This will result in an output signal no longer being supplied to indexing motor 14, and the rotation of commutator C will be stopped. To insure that the commutator is stopped, a brake 34 is actuated. Brake 34 also supplies a signal to the servomotor 36 of an operating tool to cause it to operate. The location of the tool is arranged such that when the insulation is sensed and the commutator is stopped, the commutator bar B will be in the proper position to be operated on by the tool. When the operation of the machine tool has been completed, it actuates a switch 38 to again operate indexing motor 14 to continue the rotation of commutator C to bring the next commutator bar B into operating position so that the cycle is repeated.

As explained above, the machine tool 36 may be a slotter for forming slots in the commutator bar, or may be a stuffing tool for inserting armature wires into the slots of the commutator bars, or may be a fusing or brazing tool for welding the armature wires in place within the commutator slots, or may be an undercutting tool for removing the insulation between commutator bars. As the machine tool 36 and the control therefor form no part of the present invention, and are well known in the prior art, they need not be discussed in further detail.

Still referring to FIG. 2, a protective housing 40 has been provided for preventing the interference of ambient and/or stray light with the operation of the photocell 30. Protective housing 40 may be formed of any material which does not transmit light, so that ambient and/or stray light is prevented from entering the space S between optical faces 22a, 26a, and the surface of the commutator C. In the preferred embodiment, the housing 40 is formed of stainless steel and effectively shields optical faces 22a, 26a and space S from external light. In addition, housing 40 is mounted such that the lower surface 40a engages the surface of the commutator, so that there is a slight rubbing engagement between surface 40a and the surface of the commutator as the commutator rotates. As housing 40 engages the commutator surface, this also opeates to effectively block out any external light in the sensing area or space S and also prevents the entry of debris or other material into the space S. As stated above, the spacing between optical faces 22a, 26a and surface 40a is preferably 0.010" which defines the space S. Also, protective housing 40 may be of any suitable shape, but preferably is cylindrical in configuration.

Figure 3:
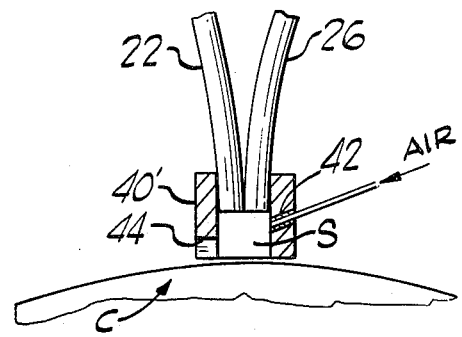
FIG. 3 is a fragmentary view of the apparatus shown in FIG. 2, which includes a modification to the protective housing.

During the manufacture of the commutator, water or water droplets sometimes remain on the surface of the commutator, and such water may interfere with the transmission and reflection of light from a reflective surface of the commutator. Accordingly, it is advantageous to remove any such water from the surface of the commutator during the detecting operation. As shown in FIG. 3, protective housing 40' may be provided with an air passageway 42 for blowing air into space S to remove any water from the surface of the commutator. In addition, a passageway (or passageways) 44 is formed therein so that any such water blown off of the surface of the commutator may escape from within the protective housing 40'. As will be understood, any suitable air jet means may be connected to passageway 42 for supplying air under pressure thereto.

Figure 4:
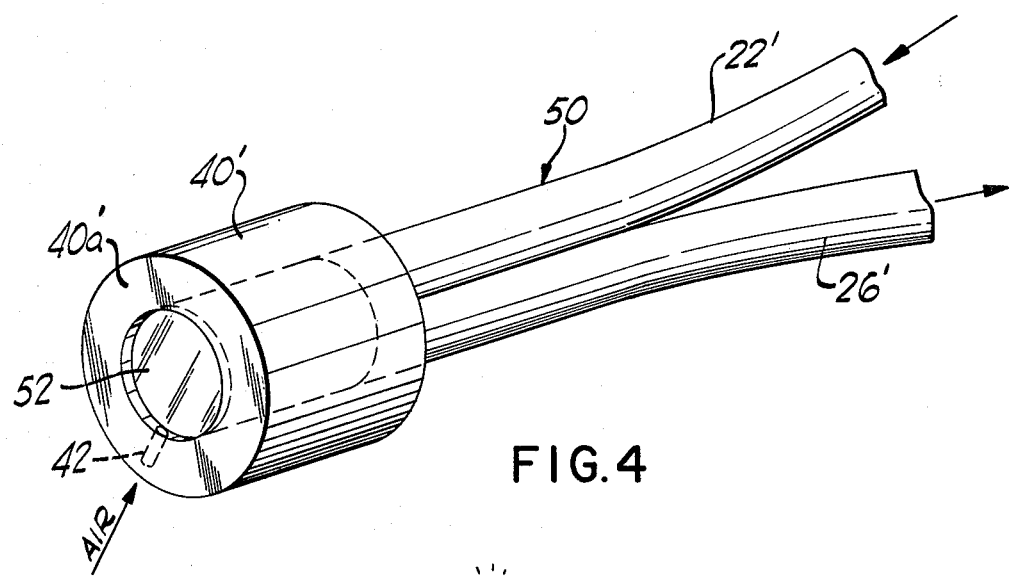
FIG. 4 is a perspective view of an alternative arrangement wherein the fiber-optic bundle is bifurcated.

It should also be understood that although FIG. 2 illustrates that fiber-optic bundles 22, 26 are separate bundles, they can in fact be formed from one bifurcated bundle, as shown in FIG. 4. A bifurcated fiber-optic bundle 50 is provided which includes fiber-optic bundle 22' having an optical face adjacent the light source, and a fiber-optic bundle 26' having an optical face adjacent the photocell 30. The other ends of fiber-optic bundles 22', 26' merge to form a common optical face 52 through which light is transmitted to the surface of the commutator and reflected therefrom. If desired, a metal tube can be provided to surround and protect the fiber-optic bundles 22', 26'.

As will also be noted from FIG. 4, protective housing 40' surrounds the merged ends of bifurcated bundle 50 in such a manner that optical face 52 is recessed approximately 0.010" from the surface 40a' of housing 40'. It will be understood that the operation of this alternative embodiment is similar to that of FIG. 2 explained above, except that there is a bifurcated fiber-optic bundle, rather than two separate fiber-optic bundles as shown in FIG. 2.

Figure 5:
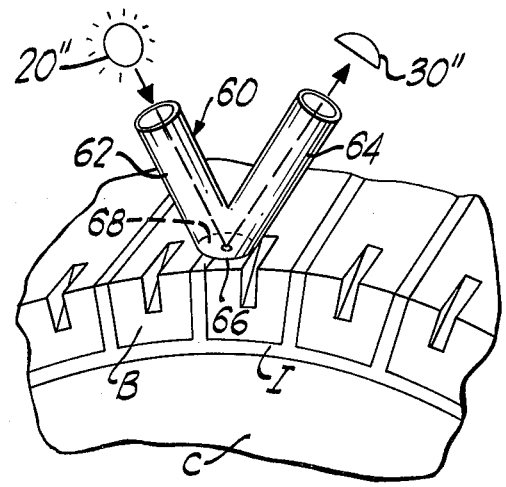
FIG. 5 is an elevational view of an alternative embodiment of the present invention wherein V-shaped pathways are employed for directing light.

Referring to FIG. 5, there is shown another alternative embodiment of the present invention. In this embodiment, a housing 60 is provided which includes converging pathways 62, 64, which are generally V-shaped in configuration. Housing 60 is formed of any suitable opaque material, such as stainless steel, and is positioned such that its lower surface 66 just engages the surface of commutator C. Also, the lower end of housing 60 includes an opening at surface 66 of a light-transmitting member 68 to close opening 66. As will be understood, light is transmitted via path 62 from light source 20" to the surface of the commutator. As the commutator C rotates and brings a reflective surface into position, light will be reflected via pathway 64 to sensor 30" which will operate the control circuit in the same manner as explained above with respect to FIG. 2.

In view of the foregoing, it will be appreciated that there has been provided in accordance with the present invention a simple and inexpensive manner of preventing the interference of ambient and/or stray light with the operation of apparatus for sensing a desired location on a commutator so that a machine tool can be operated to perform an operation on the commutator. In addition, the apparatus of the present invention is not effected by inaccuracies in the manufacture of the commutator such as differences in the widths of the commutator bars or differences in the width of the insulation material between the commutator bars, or by differences in the location of the commutator slot relative to a commutator bar. In addition, such apparatus may be used for any of the functions in commutator manufacture, including slotting, insertion of armature wires into commutator slots, fusing, or undercutting.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for sensing a predetermined location on a commutator and, in response thereto, actuating a tool for performing an operation on said commutator, comprising:

means for mounting and rotating said commutator;

a light source positioned a predetermined distance from the surface of said commutator:

first means for directing light from said light source to the surface of said commutator;

means for sensing the reflection of light from said commutator surface;

second means for directing light reflected from said commutator surface to said sensing means;

means responsive to said sensing means for actuating said tool for performing an operation on said commutator;

protective means at least partially enclosing said first and second light-directing means for preventing the interference of ambient and/or stray light with the operation of said sensing means, said protective means including a housing having a first end in rubbing engagement with said commutator surface and a second end for receiving the ends of said first and second light-directing means and spacing said ends of said first and second light-directing means from said first end of said housing to form a space within said housing between said ends of said first and second light-directing means and said first end of said housing; and supplying means for supplying air under pressure into said space and directly onto said commutator surface.

2. Apparatus in accordance with claim 1, wherein said commutator surface includes light-reflective areas and non-reflective areas, said sensing means being responsive to the non-reflection of light from said non-reflective areas to actuate said tool.

3. Apparatus in accordance with claim 1, further including means responsive to the operation of said tool to actuate said rotating means to rotate said commutator to move the next commutator bar into position for sensing.

4. Apparatus in accordance with claim 1, wherein said first and second light-directing means includes fiber-optic bundle means.

5. Apparatus in accordance with claim 4, wherein said fiber-optic bundle means is bifurcated and includes a common optical face.

6. Apparatus in accordance with claim 4, wherein said fiber-optic bundle means includes two separate fiber-optic bundles, one of said bundles directing light from said light source, and one of said bundles directing light to said sensing means.

7. Apparatus in accordance with claim 1, wherein said housing is formed at least partially of opaque material to prevent the transmission of light into said space.

8. Apparatus in accordance with claim 1, wherein said housing has two converging pathways forming a generally V-shaped configuration, one of said pathways forming said first light-directing means and the other of said pathways forming said second light-directing means, the convergence of said pathways being in rubbing engagement with said cummutator surface.

9. Apparatus in accordance with claim 8, wherein said housing at the convergence of said pathways is capable of transmitting light.

10. Apparatus in accordance with claim 1, wherein said supplying means includes a passageway formed in said housing.

11. Apparatus in accordance with claim 1, wherein said light source is a light-emitting diode.

12. Apparatus in accordance with claim 1, wherein said sensing means includes a photocell.

13. Apparatus in accordance with claim 1, further including means for stopping the rotation of said commutator, said stopping means being responsive to said sensing means.

* * * * *